United States Patent [19]

Baragar et al.

[11] Patent Number: 5,745,952
[45] Date of Patent: May 5, 1998

[54] CONSTRAINED HERMAPHRODITIE BALL AND SOCKET HINGE JOINT

[75] Inventors: Marc Christopher Baragar, Vancouver; Michael John Roman, Burnaby, both of Canada

[73] Assignee: Xenophon Design Inc., Vancouver, Canada

[21] Appl. No.: 674,683

[22] Filed: Jul. 2, 1996

[30] Foreign Application Priority Data

Jul. 4, 1995 [CA] Canada ................ 2153200

[51] Int. Cl.⁶ .............. E05D 7/00; G02C 5/22
[52] U.S. Cl. ............ 16/228; 16/224; 351/115; 403/135
[58] Field of Search .......... 16/228, 224; 351/115, 351/112, 121, 119, 140, 153; 403/135, 143, 122, 52

[56] References Cited

U.S. PATENT DOCUMENTS

3,476,466  11/1969  Hopkins .
3,691,788   9/1972  Mazziotti ................. 16/224
3,714,678   2/1973  Weisz et al. .............. 16/224
4,017,165   4/1977  Davis .
5,229,795   7/1993  Heintzelman .
5,249,334  10/1993  Horberg et al. ........... 403/135
5,315,328   5/1994  Hofmair et al. ........... 351/153
5,570,492  11/1996  Nakanishi ................. 16/228

Primary Examiner—Chuck Mah

[57] ABSTRACT

A hermaphroditic ball and socket joint permits a ball to rotate freely within a socket within constrained bounds. The socket resides within a housing that has an exterior surface having a rotational axis of symmetry passing through the center of the socket. A channel connects the socket to the exterior surface. The ball extends from a member having a collar which partially enshrouds the ball and which has an inside surface that is substantially identical to the exterior surface of the socket housing and which has an axis of rotational symmetry passing through the center of the ball. The free rotation of the ball in the socket is constrained by the restricted movement of the member through the channel and the restricted rotation of the collar around the exterior surface of the housing.

24 Claims, 9 Drawing Sheets

CONSTRAINED HERMAPHRODITIE BALL AND SOCKET HINGE JOINT

FIELD

This invention relates to hinge joints. More specifically, it relates to a constrained ball and socket joint suitable for attaching an eyeglass earpiece to an eyeglass frame.

BACKGROUND

Hinge joints simultaneously serve two purposes: they facilitate movement in certain directions and constrain movement in other directions. Both functions are critical. The first function facilitates movement and change of shape. The second function facilitates alignment of parts and resistance to external forces.

A simple hinge consists of a stationary pin and two members adapted to rotate about the pin's axis of rotational symmetry. Each member sweeps out an arc centred at the pin; no other movement relative to the pin is possible. The cylindrical geometry of the simple hinge permits a door to rotate open but constrains the door to remain upright and aligned with the door jam.

There are many applications where movement in more than one plane is desirable. This need led to the development of the ball and socket joint. A typical ball and socket joint comprises two parts. A first member has one end that terminates in a ball. A second member has one end that terminates in a spherical shell sized to snugly envelope the ball, the shell defining an aperture sized to permit the ball to be pressed firmly into the interior of the shell or socket. When the ball is within the socket, the centres of the ball and socket are coincident, resulting in a spherical geometry that facilitates full three dimensional rotation of the first and second members about the coincident centres. This rotation is constrained only by the collision of the first member with an edge of the aperture. Generally, the first and second members can be rotated even about their longitudinal axes so long as such motion does not cause the first member to bind against an edge of the aperture.

However, there are many applications where it is desirable for a hinge joint both to permit movement in multiple planes and to constrain such movement to specific portions of space. The conventional ball and socket joint has very poor constraint characteristics.

One such application is the attachment of an earpiece to the frame of a pair of glasses. It is desirable for the earpiece to rotate in the horizontal plane so as to fold against the frame for storage. It is also desirable for the earpiece to rotate in the vertical plane so as to adapt to the incline of the wearer's face. However, when a pair of glasses is being worn, it is desirable that they remain rigid and firmly in place; the hinge must constrain the movement of the earpiece. Although the free movement function would suggest a conventional ball and socket joint, the constraint function would suggest no hinge at all.

U.S. Pat. No. 5,229,795 granted on Jul. 20, 1993 to E. Earl Heintzelman for "Eyeglass Frames Adapted to Hang Flat Against a Wearer's Chest", teaches the use of a dual axis hinge mechanism for connecting the earpiece to the frame. This invention is essentially an application of a universal joint to eyeglasses. The earpiece is attached to the frame by a hinge that permits the earpiece to move within the horizontal plane. The earpiece is rotateably attached to the hinge by a horizontal pin that permits the earpiece to pivot within the vertical plane.

The Heintzelman hinge mechanism appears to have a number of disadvantages. The generous freedom of movement permitted by the dual axis hinge seems likely to compromise the constraint characteristics needed to keep the glasses rigid on the wearer's face. The mechanism also appears fragile and subject to easy damage because the horizontal pin appears to be ill-adapted to resist torsional forces on the earpiece.

U.S. Pat. No. 4,017,165 granted to James F. Davis on Apr. 12, 1977 for "Eyeglass Frames" teaches a different dual axis hinge mechanism also apparently derived from the universal joint. The eyeglass frame includes a reverse C-shaped hinge pin having a vertical protrusion extending from each end. The earpiece terminates at its frame end in a substantially C-shaped socket adapted to envelope the reverse C-shaped hinge pin and rotate about it through the vertical plane. Each vertical protrusion on the hinge pin pierces the earpiece through one of a series of connected serrations in the top and bottom surfaces of its frame end. The serrations simultaneously constrain the earpiece's vertical plane rotation to discrete positions and cooperate with the protrusions to form a horizontal axis of rotation.

The Davis hinge has disadvantages. Both the protrusions and the hinge pin itself are thin elongated members which are exposed when the earpiece is rotated into certain positions. So exposed, the protrusions and hinge pin might either poke the wearer or break. These fragile, exposed members are of questionable utility as constraints, particularly when the wearer is engaged in energetic physical activity.

Finally, U.S. Pat. No. 3,476,466 granted to Roger B. Hopkins on Nov. 4, 1969 for "Forwardly Folding Eyeglass Temples Having Ball and Socket Hinges" teaches a constrained ball and socket joint for attaching the earpieces to the frame. A horizontal slot in the frame extending along the outside of the temple exposes a socket. A ball extends from the inside surface of the earpiece for insertion into the socket. Earpiece movement is constrained by the locus of the slot and by a spur protruding from the frame which prevents the earpiece from rotating beyond a specific horizontal angle.

The Hopkins hinge joint also suffers from a number of disadvantages. Because the slot opens in the same direction as the outward forces applied by the wearer's face against the earpiece, the ball and socket alone must withstand these forces. Also the external spur might injure a person, might be broken against an object, or might bend or break under the stress applied by the earpiece. What is needed is a multi-axis joint that can be robustly constrained. The joint should not employ spurs, protrusions or similar weak external members as constraints. The constraining forces should be exerted against and distributed over the joints internal surfaces.

SUMMARY

The subject invention is directed to such a hinge joint. Essentially, the joint of the invention exploits the rotational symmetries and asymmetries of a plurality of coaxial members to facilitate certain movement and constrain certain other movement.

According to one aspect of the invention, there is provided a constrained joint comprising: a ball having at least one axis of rotational symmetry; a housing having an exterior surface with at least one axis of rotational symmetry, the housing defining: a socket having at least one axis of rotational symmetry and having its center lying on the exterior surface's axis of rotational symmetry, the socket being adapted to receive the ball for rotation there within such that the center of the ball is coincident with the center of the socket, and a channel connecting the socket to the exterior surface of the housing, a member extending from the ball and adapted to slide within the channel, and a collar extending from the member and partially enshrouding the ball, the collar defining an interior surface with at least one axis of rotational symmetry that passes through the center of the ball, the interior surface of the collar being adapted to receive the housing for rotation there within such that the axis of rotational symmetry of the exterior surface of the housing is coaxial with the axis of rotational symmetry of the interior surface of the collar. In a preferred embodiment the ball is substantially spherical, the socket is substantially spherical, the exterior surface of the housing is substantially semi-conical, and the interior surface of the collar defines a substantially conical sector. Alternatively, the exterior surface of the housing might define a substantially semi-conical cam.

According to another aspect of the invention, there is provided in a constrained joint having a first part made up of a housing having an exterior surface with at least one axis of rotational symmetry, the housing defining: a socket having at least one axis of rotational symmetry and having its center lying on the exterior surface's axis of rotational symmetry, and a channel connecting the socket to the exterior surface of the housing, a second part, comprising: a ball having at least one axis of rotational symmetry and being adapted to be received for rotation within the socket such that the center of the ball is coincident with the center of the socket, a member extending from the ball and adapted to slide within the channel, and a collar extending from the member and partially enshrouding the ball, the collar defining an interior surface with at least one axis of rotational symmetry that passes through the center of the ball, the interior surface of the collar being adapted to receive the housing for rotation there within such that the axis of rotational symmetry of the exterior surface of the housing is coaxial with the axis of rotational symmetry of the interior surface of the collar. In a preferred embodiment the ball is substantially spherical, the socket is substantially spherical, the exterior surface of the housing is substantially semi-conical, and the interior surface of the collar defines a substantially conical sector. Alternatively, the exterior surface of the housing might define a substantially semi-conical cam.

According to yet another aspect of the invention, there is provided in a constrained joint having a first part made up of a ball having at least one axis of rotational symmetry, a member extending from the ball, and a collar extending from the member and partially enshrouding the ball, the collar defining an interior surface with at least one axis of rotational symmetry that passes through the center of the ball, a second part, comprising: a housing having an exterior surface with at least one axis of rotational symmetry, the exterior surface of the housing being adapted to be received within the interior surface of the collar for rotation there within such that the axis of rotational symmetry of the exterior surface of the housing is coaxial with the axis of rotational symmetry of the interior surface of the collar, the housing defining: a socket having at least one axis of rotation symmetry and having its center lying on the exterior surface's axis of rotational symmetry, the socket being adapted to receive the ball for rotation there within such that the center of the ball is coincident with the center of the socket, and a channel connecting the socket to the exterior surface of the housing and adapted to slideably receive the member. In a preferred embodiment the ball is substantially spherical, the socket is substantially spherical, the exterior surface of the housing is substantially semi-conical, and the interior surface of the collar defines a substantially conical sector. Alternatively, the exterior surface of the housing might define a substantially semi-conical cam.

According to still a further aspect of the invention, there is provided in a pair of eyeglasses having a frame and an earpiece, a constrained joint for attaching the earpiece to the frame, comprising: a ball having at least one axis of rotational symmetry; a housing having an exterior surface with at least one axis of rotational symmetry, the housing defining: a socket having at least one axis of rotational symmetry and having its center lying on the exterior surface's axis of rotational symmetry, the socket being adapted to receive the ball for rotation there within such that the center of the ball is coincident with the center of the socket, and a channel connecting the socket to the exterior surface of the housing, a member, extending from the ball and adapted to slide within the channel, and a collar extending from the member and partially enshrouding the ball, the collar defining an interior surface with at least one axis of rotational symmetry that passes through the center of the ball, the interior surface of the collar being adapted to receive the housing for rotation there within such that the axis of rotational symmetry of the exterior surface of the housing is coaxial with the axis of rotational symmetry of the interior surface of the collar. In a preferred embodiment the ball is substantially spherical, the socket is substantially spherical, the exterior surface of the housing is substantially semi-conical, and the interior surface of the collar defines a substantially conical sector. Alternatively, the exterior surface of the housing might define a substantially semi-conical cam.

These and other features, aspects and advantages of the present invention will become better understood with reference to the following description, appended claims, and accompanying drawings, where:

DESCRIPTION

Figure 1A:
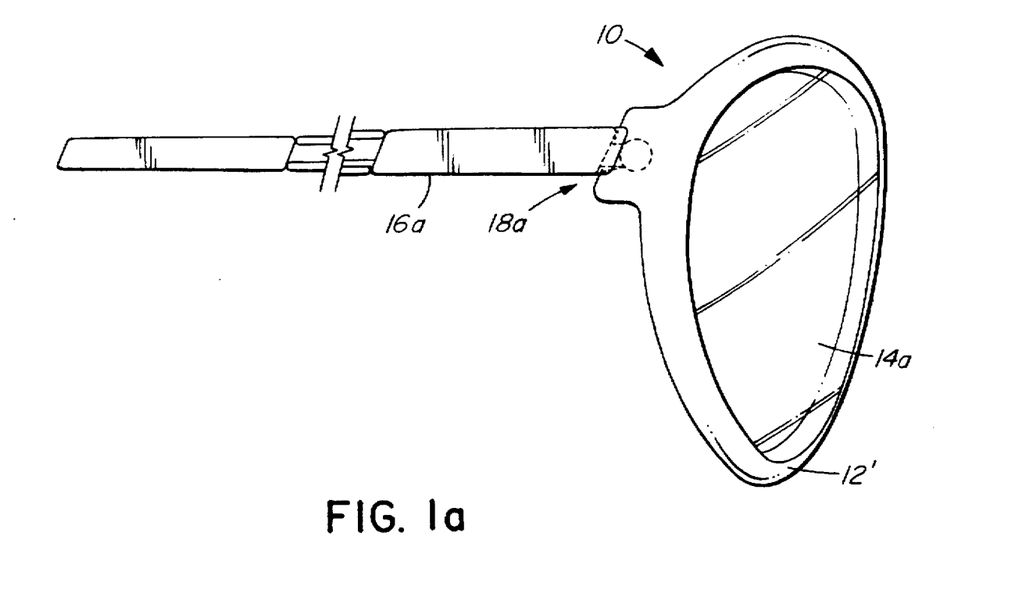
FIG. 1a is a side view of a pair of eyeglasses having a joint embodying one aspect of the invention, the eyeglass frame being aligned substantially perpendicular to the earpiece.
Figure 1B:
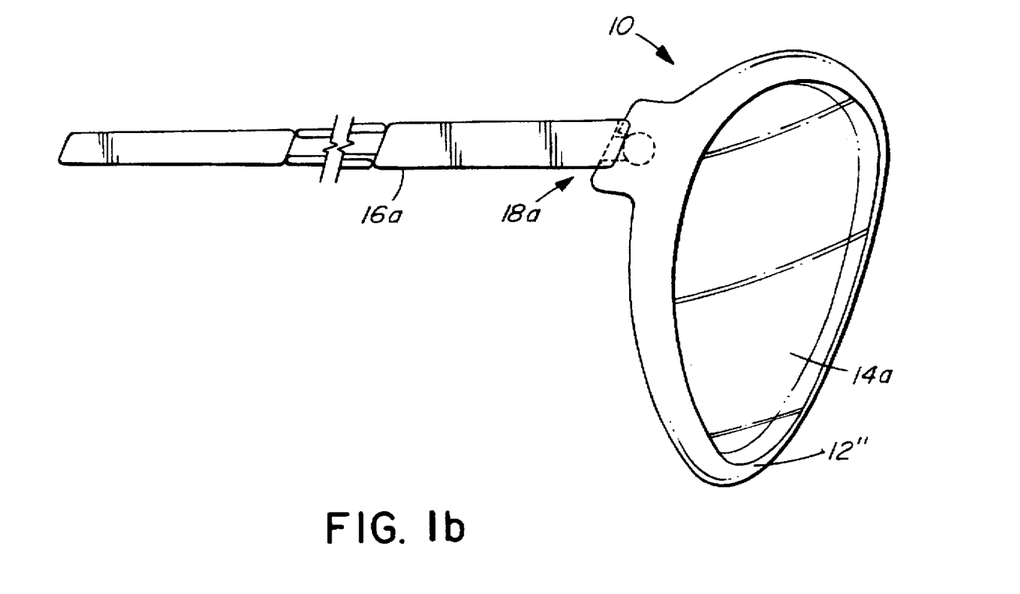
FIG. 1b is a side view of the pair of eyeglasses of FIG. 1a, the eyeglass frame being aligned obliquely to the earpiece.
Figure 2:
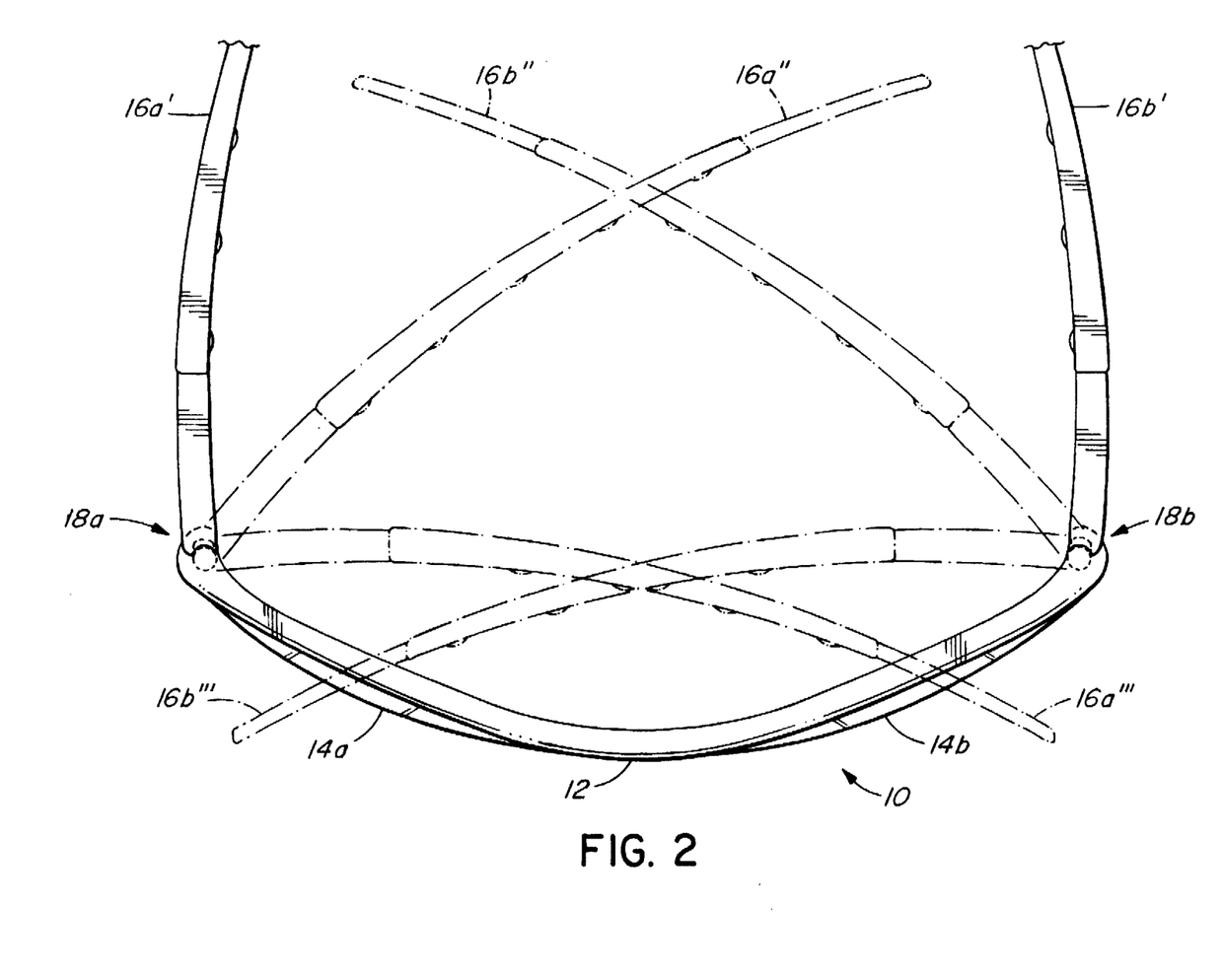
FIG. 2 is a top view of the pair of eyeglasses of FIG. 1a, illustrating the earpieces in substantially perpendicular, oblique, and substantially parallel alignment to the eyeglass frame.
Figure 3:
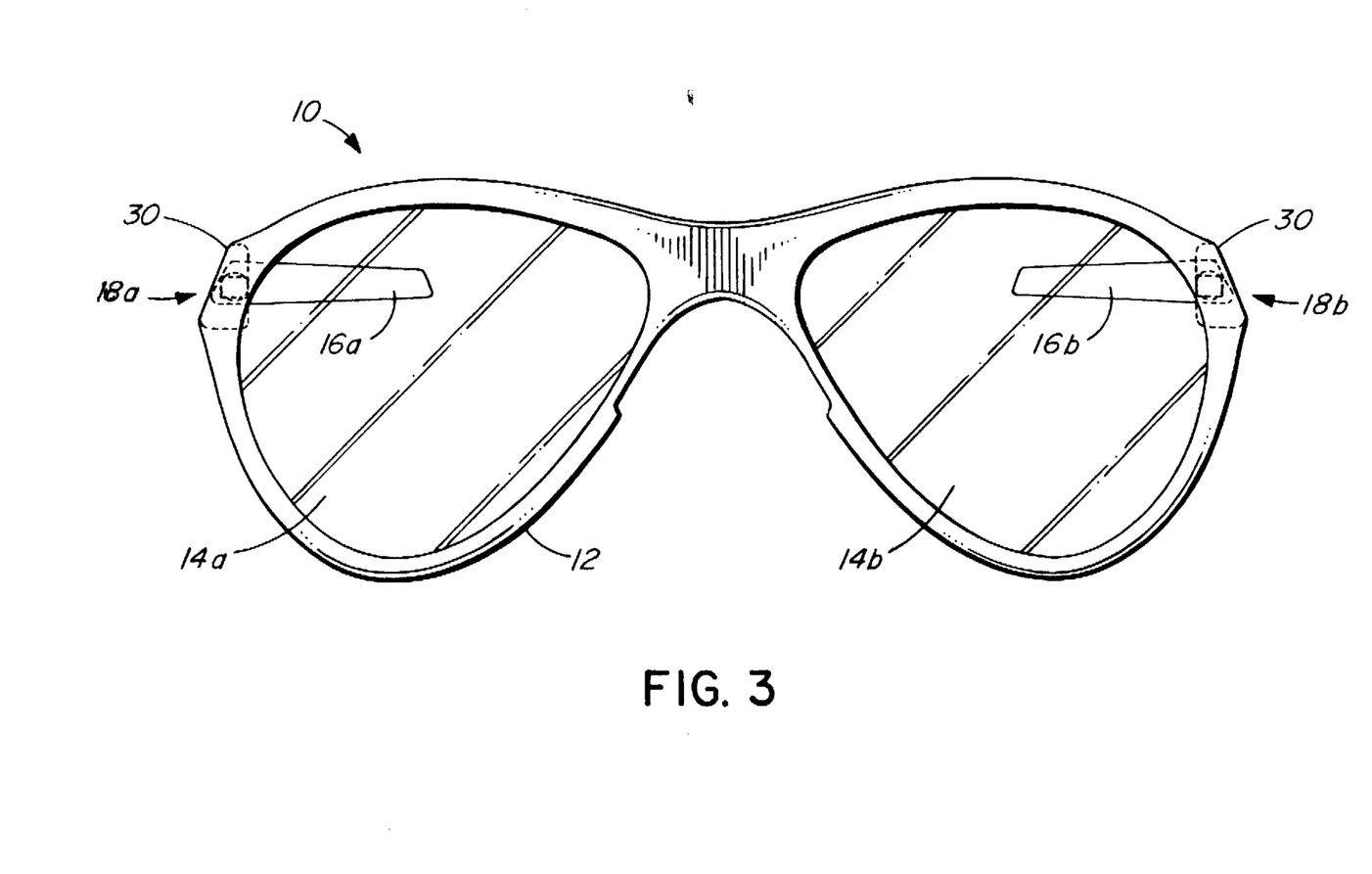
FIG. 3 is a front view of the pair of eyeglasses of FIG. 1a, illustrating the earpieces in substantially perpendicular alignment to the frame.
Figure 4A:
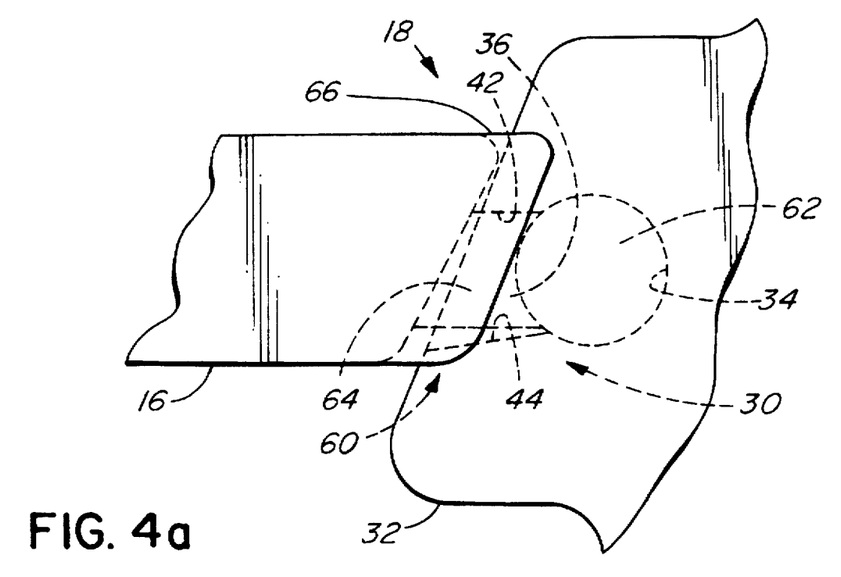
FIG. 4a is a side view detailing the joint mechanism of the eyeglasses of FIG. 1a, the eyeglass frame being aligned substantially perpendicular to the earpiece.
Figure 4B:
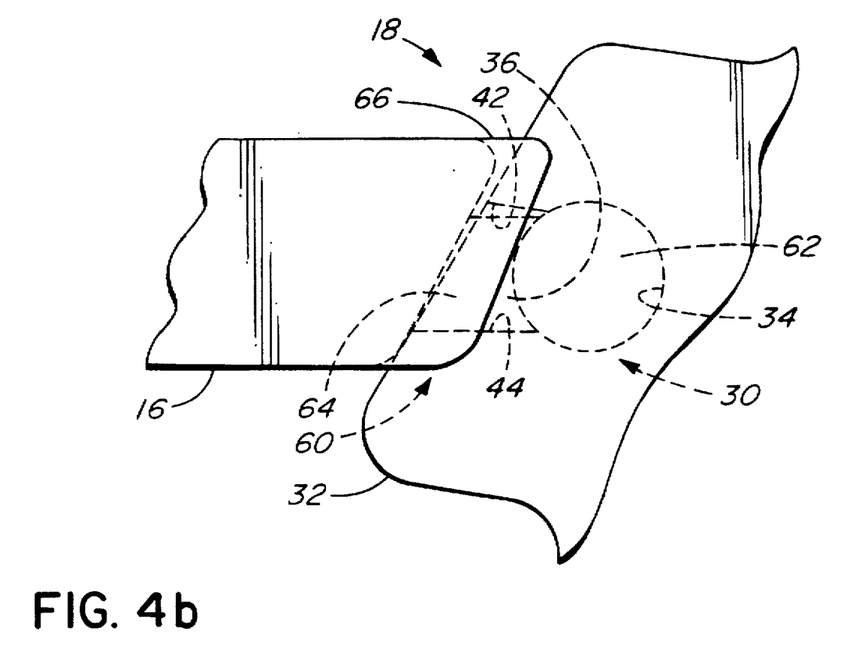
FIG. 4b is a side view detailing the joint mechanism of the eyeglasses of FIG. 1a, the eyeglass frame being aligned obliquely to the earpiece.
Figure 5A:
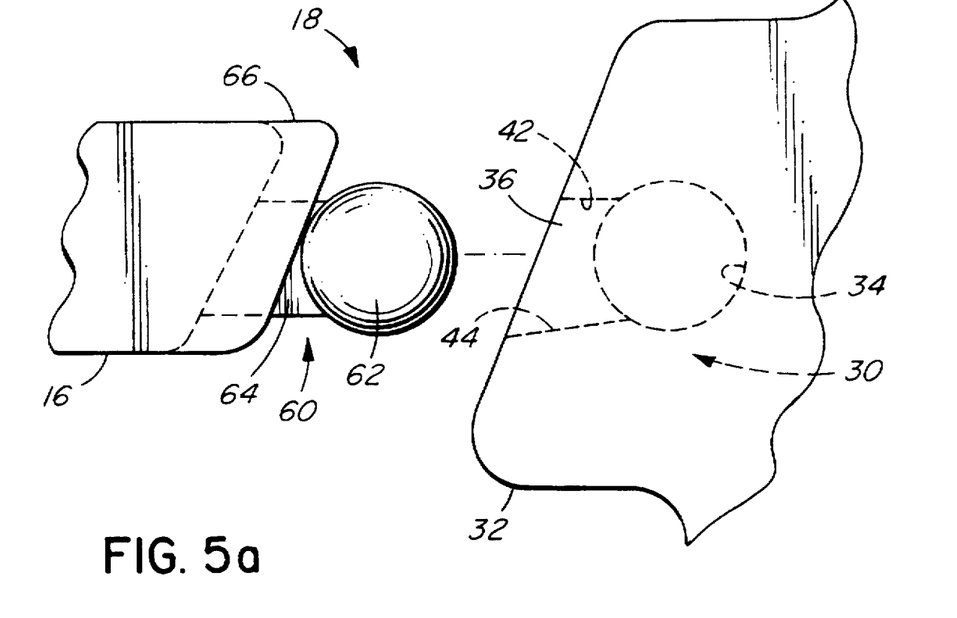
FIG. 5a is an exploded side view detailing the joint mechanism of the eyeglasses of FIG. 1a, the eyeglass frame being aligned substantially perpendicular to the earpiece.
Figure 5B:
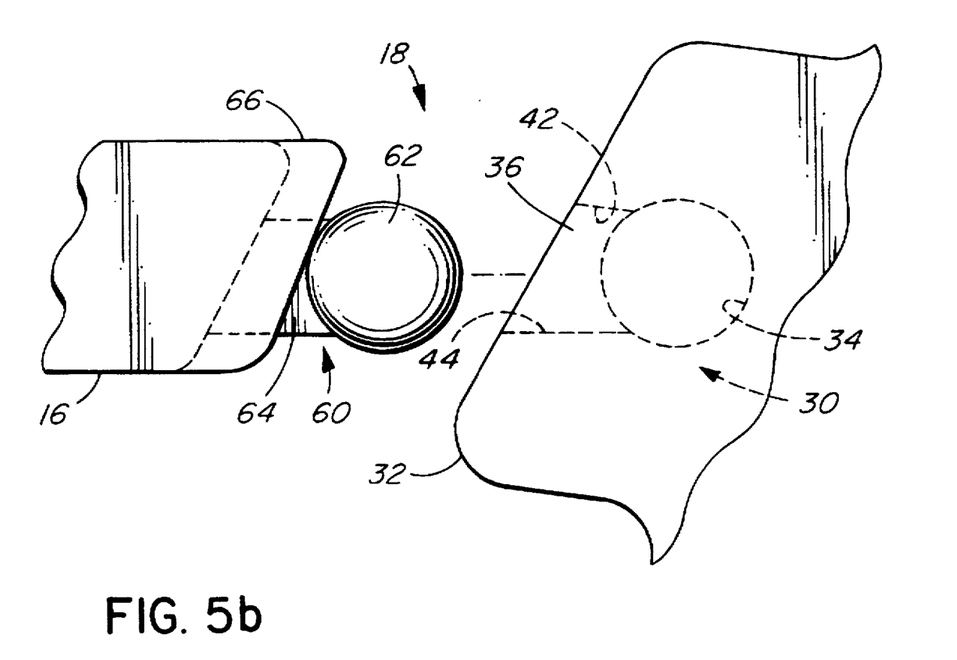
FIG. 5b is an exploded side view detailing the joint mechanism of the eyeglasses of FIG. 1a, the eyeglass frame being aligned obliquely to the earpiece.
Figure 6A:
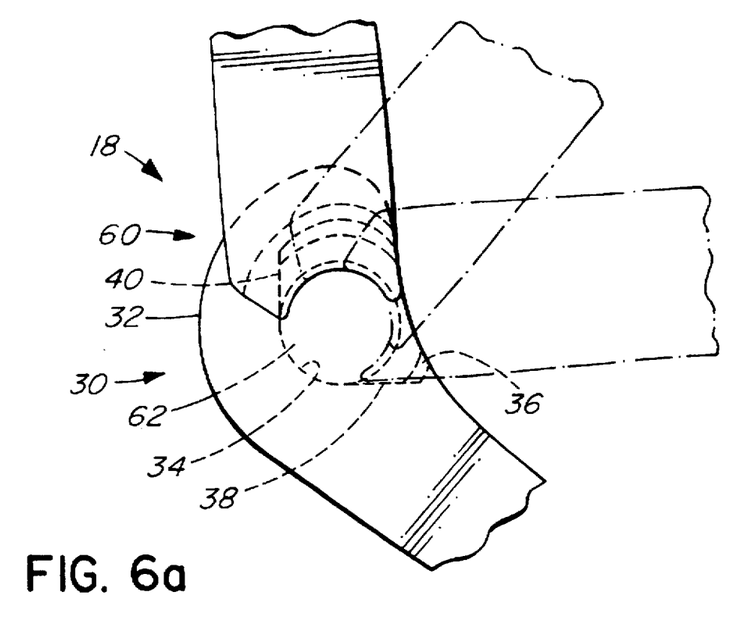
FIG. 6a is a top view detailing the joint mechanism of the eyeglasses of FIG. 1a, illustrating the earpiece in substantially perpendicular, oblique, and substantially parallel alignments to the eyeglass frame.
Figure 6B:
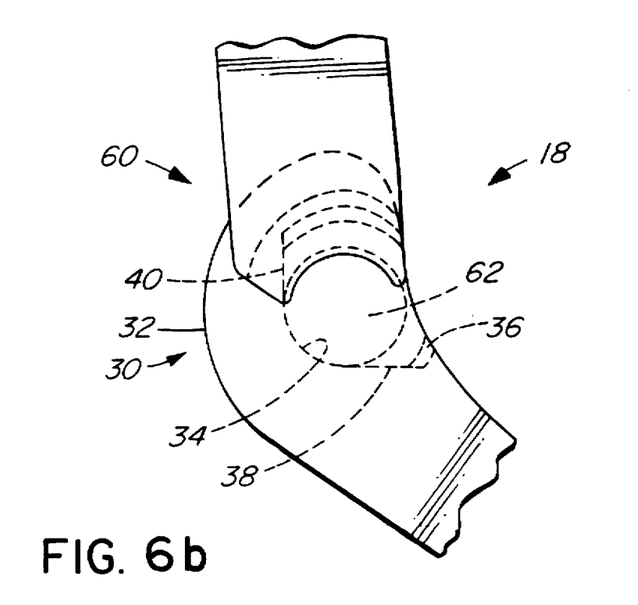
FIG. 6b is a top view detailing the joint mechanism of the eyeglasses of FIG. 1a, illustrating the earpiece in substantially perpendicular alignment to the eyeglass frame.
Figure 6C:
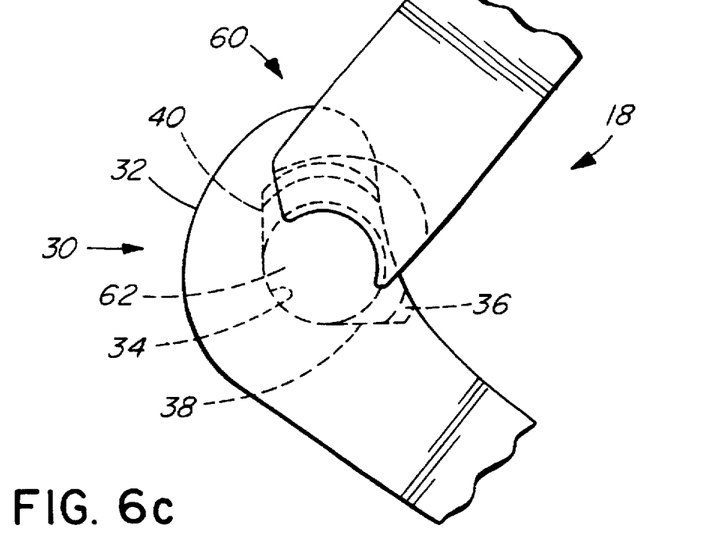
FIG. 6c is a top view detailing the joint mechanism of the eyeglasses of FIG. 1a, illustrating the earpiece in oblique alignment to the eyeglass frame.
Figure 6D:
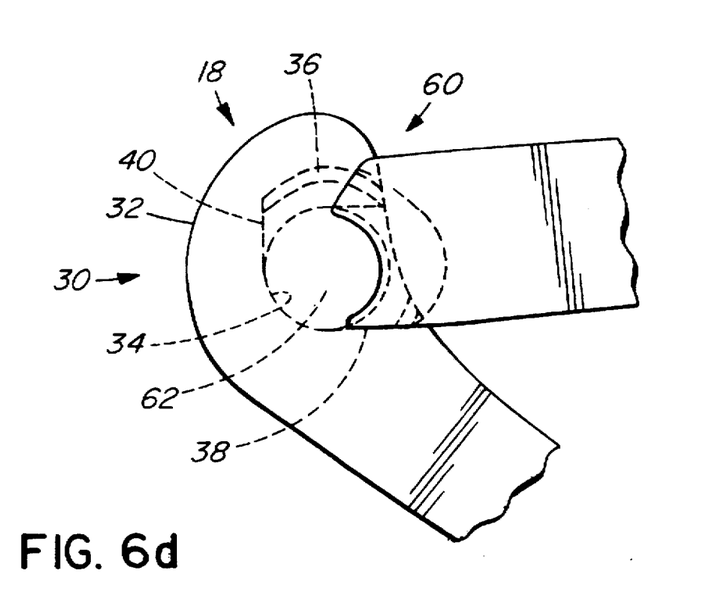
FIG. 6d is a top view detailing the joint mechanism of the eyeglasses of FIG. 1a, illustrating the earpiece in substantially parallel alignment to the eyeglass frame.
Figure 7:
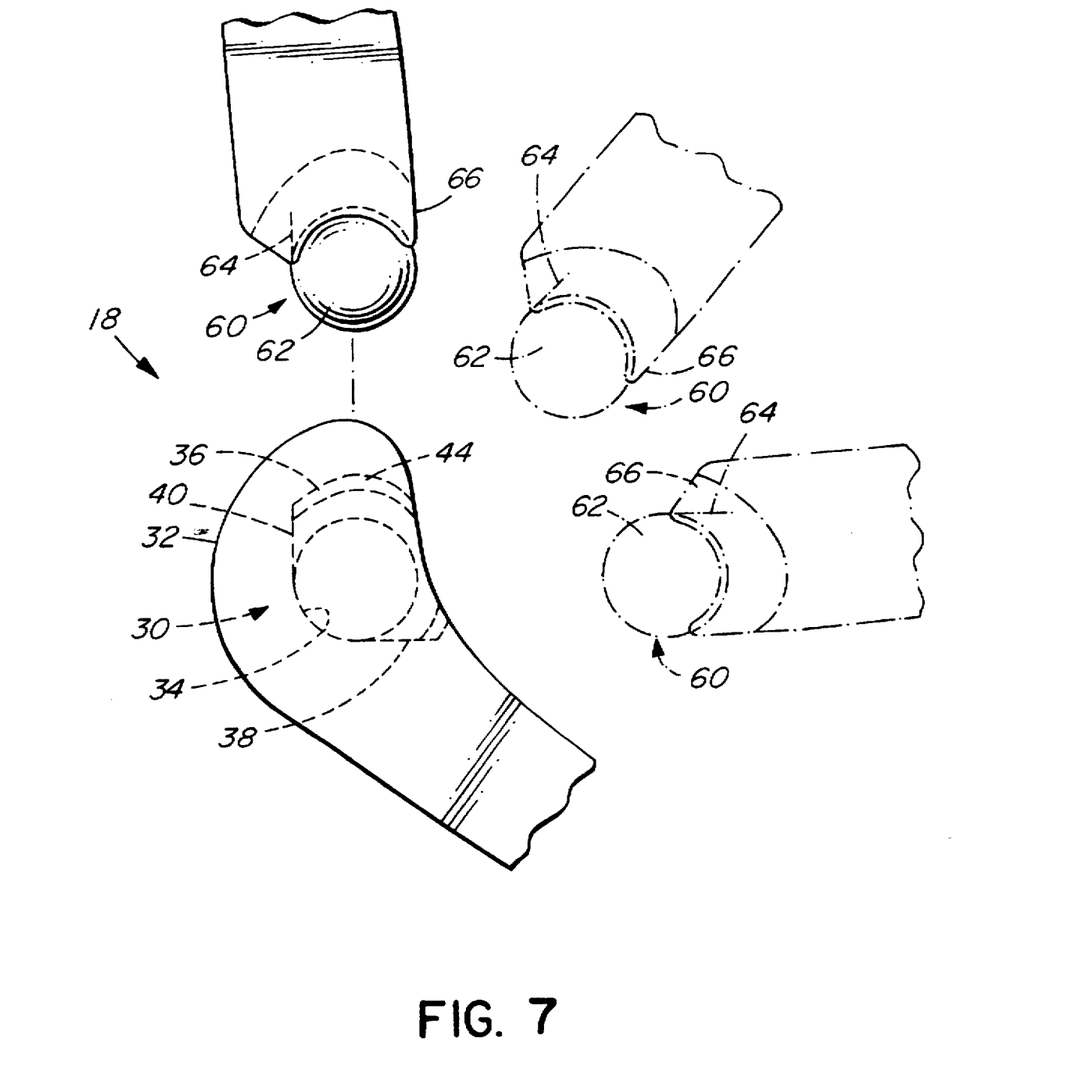
FIG. 7 is an exploded top view detailing the joint mechanism of the eyeglasses of FIG. 1a, illustrating the earpiece in substantially perpendicular, oblique, and substantially parallel alignments to the eyeglass frame.
Figure 8:
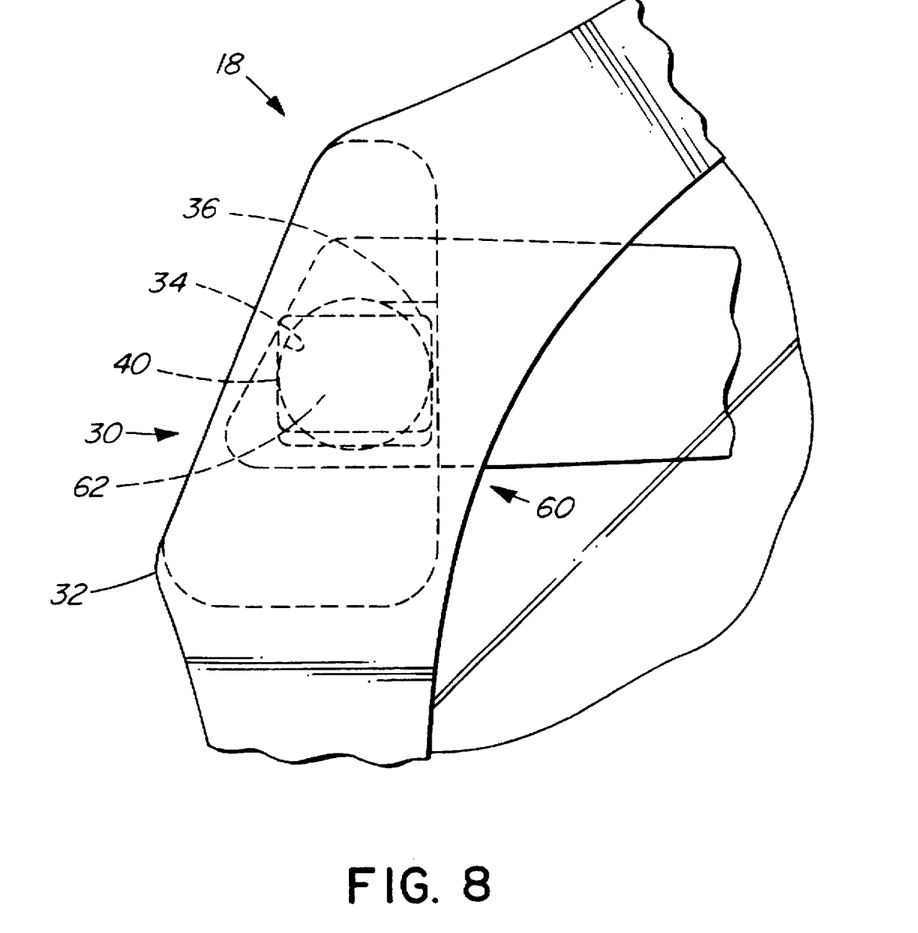
FIG. 8 is a front view detailing the joint mechanism of the eyeglasses of FIG. 1a, illustrating the earpieces in substantially perpendicular alignment to the frame.

With reference now to FIGS. 1, 2, and 3, a pair of eyeglasses is illustrated generally at 10. The eyeglasses 10 include a frame 12 retaining first and second lenses 14a, 14b. First and second earpieces 16a, 16b depend from the frame 12 through first and second hermaphroditic ball and socket joints generally illustrated at 18a, 18b. The joints 18a, 18b permit the earpieces 16a, 16b to rotate continuously through portions of the horizontal and vertical planes with reference to the frame 12.

With reference now to FIG. 1a, the frame 12 may be so disposed with respect to the earpiece 16 as to adopt a substantially perpendicular alignment 12'. With reference now to FIG. 1b, the frame 12 may be so disposed with respect to the earpiece 16 as to adopt an oblique alignment 12".

With reference now to FIG. 2, first and second earpieces 16a, 16b may be so disposed with respect to the frame 12 as to adopt a substantially perpendicular alignment 16a', 16b', an oblique alignment 16a", 16b", or a substantially parallel alignment 16a'", 16b'".

With reference now to FIGS. 4, 5, 6, 7, and 8 the joint 18 will now be described in greater detail. The joint 18 includes a female-male portion generally illustrated at 30 on the frame 12 and a male-female portion generally illustrated at 60 extending from the earpiece 16.

The female-male portion 30 includes a housing 32 having a substantially semi-conical exterior surface and containing a substantially spherical socket 34 having its center lying on the housing's 32 axis of rotational symmetry. The socket 34 opens onto the exterior surface of the housing 32 via a channel 36. The channel 36 is a substantially ungular shape, truncated by first and second tangent planes 38, 40 to the socket 34 and having a first surface 42 and a second surface 44. The first and second surfaces 42, 44 slope toward each other from the first tangent plane 38 to the second tangent plane 40 thereby narrowing the channel 36 toward the second tangent plane 40. The first and second surfaces 42, 44 slope away from each other from the socket 34 to the exterior surface of the housing 32, thereby widening the channel 36 toward the exterior surface of the housing 32.

The male-female portion 60 is substantially the inverse of the female-male portion 30. The male-female portion 60 comprises a substantially spherical ball 62 extending from the earpiece 16 via an extension 64. The ball 62 is adapted to rotate snugly within the socket 34 through both the horizontal and vertical planes, and to slide through the widest part of the channel 36 adjacent the first tangent plane 38 so that the earpiece 16 may be disengaged from the frame 12. The extension 64 is fitted within the channel 36 so as to rotate through the horizontal plane constrained between the channel's first and second tangent planes 38, 40, to rotate through the vertical plane constrained between the channel's 36 first and second surfaces 42, 44 but to resist rotating along the longitudinal axis of the earpiece 16.

The ball 62 is partially enshrouded by a collar 66 that has an interior surface defining a conical sector having an axis of rotational symmetry passing through the center of the ball 62. The interior surface of the collar 66 corresponds closely to the exterior surface of the housing 32, but has a larger apex angle. The difference between the two apex angles corresponds to the angle defined between the first and second surfaces 42, 44 inside the channel 36. When the ball 62 is within the socket 34, the exterior surface of the housing 32 and the interior surface of the collar 66 have coaxial axes of rotational symmetry such that the housing 32 acts somewhat like a ball that is rotateable with in the collar 66 which acts somewhat like a socket.

The collar 66 is shaped to facilitate rotation of the earpiece 16 about the collar's 66 axis of rotational symmetry, to constrain rotation of the earpiece through the vertical plane within the limits set by the angle between the first and second surfaces 42, 44 inside the channel 36, but to resist torsional rotation along the longitudinal axis of the earpiece 16. In a preferred embodiment, the exterior surface of the housing 32 form a semi-conical cam constraining the horizontal plane rotation of the collar 66 about the housing 32 to the region where the radius of curvature the exterior surface of the housing 32 is less than the radius of curvature of the interior surface of the collar 66.

In operation, the wearer inserts the ball 62 into the socket 34 through the widest portion of the channel 36 adjacent the first tangent plane 38. The wearer can then freely rotate the ball 62, and hence the earpiece 16, within the housing 32 subject to the simultaneous constraints of the extension 64 against the interior surfaces 38, 40, 42, 44 of the channel 36 and the collar 66 against the housing 32.

Although a specific embodiment of the present invention has been described and illustrated, the present Invention is not limited to the features of this embodiment, but includes all variations and modifications within the scope of the claims.

For example, it is contemplated that other ball, socket, housing and collar geometries would be suitable for facilitating other loci of constrained movement. Any of the ball, socket, housing, or collar might be cylindrical, conical, spherical, ellipsoidal, paraboloidal, or cam-shaped. The underlying theme is that these four parts must have rotational symmetries and asymmetries that can be variously aligned to permit or constrain movement. It is contemplated that to discretize the permitted movement, a part could replace its one smooth curvilinear surface with an unsmooth composite surface comprised of the piecewise connection of a plurality of discrete smooth surfaces.

It should be understood that the term "rotational symmetry" is being used more expansively in this patent than is usual in a number of respects. First, the rotational symmetries for the purpose of this patent are not limited to those based on conventional angles such as 360 degrees, 180 degrees, 90 degrees, or 45 degrees. Second, the rotational symmetries may ignore the minor asymmetries imposed by composite surfaces used for discretization. Third, where a cam shape is involved, the rotational symmetry is augmented by an angle dependant scaling factor.

The channel need not be ungular or even smooth; what is important is that the channel and the extension mate to constrain or permit specified movement between the two halves of the joint. It is contemplated that notches could be set into the channel to discretize the permitted movement.

It is contemplated that more than two sets of coaxial balls and sockets could be nested to distribute the forces on the joint over an even greater area or to provide more complicated constraints.

Finally, it is contemplated that such joints could find wide application outside of the eyeglass field.

The embodiments of the invention in which an exclusive property or privilege is claimed are defined as follows:

1. A constrained joint comprising:
   (a) a ball having at least one axis of rotational symmetry;
   (b) a housing having an exterior surface with at least one axis of rotational symmetry, the housing defining:
      (i) a socket adapted to receive the ball for rotation there within such that the center of the ball is coincident with the center of the socket, the socket having at least one axis of rotational symmetry and having its centre lying on the exterior surfaces axis of rotational symmetry, and
      (ii) a channel connecting the socket to the exterior surface of the housing,
   (c) a member extending from the ball and adapted to move within the channel, and
   (d) a collar extending from the member and partially enshrouding the ball, the collar defining an interior surface with at least one axis of rotational symmetry that passes through the center of the ball, the interior surface of the collar being adapted to receive the housing for rotation there within such that the axis of rotational symmetry of the exterior surface of the housing is coaxial with the axis of rotational symmetry of the interior surface of the collar.

2. A joint as in claim 1 wherein the ball is substantially spherical.

3. A joint as in claim 2 wherein the socket is substantially spherical.

4. A joint as in claim 3 wherein the exterior surface of the housing is substantially semi-conical.

5. A joint as in claim 4 wherein the interior surface of the collar defines a substantially conical sector.

6. A joint as in claim 5 wherein the exterior surface of the housing defines a substantially semi-conical cam.

7. In a constrained joint having a first part made up of a housing having an exterior surface with at least one axis of rotational symmetry, the housing defining: a socket having at least one axis of rotational symmetry intersecting the exterior surface's axis of rotational symmetry, and a channel connecting the socket to the exterior surface of the housing, a second part, comprising:
   (a) a ball having at least one axis of rotational symmetry and being adapted to be received for rotation within the socket such that the center of the ball is coincident with the center of the socket,
   (b) a member extending from the ball and adapted to move within the channel, and
   (c) a collar extending from the member and partially enshrouding the ball, the collar defining an interior surface with at least one axis of rotational symmetry that passes through the center of the ball, the interior surface of the collar being adapted to receive the housing for rotation there within such that the axis of rotational symmetry of the exterior surface of the housing is coaxial with the axis of rotational symmetry of the interior surface of the collar.

8. A joint as in claim 7 wherein the ball is substantially spherical.

9. A joint as in claim 8 wherein the socket is substantially spherical.

10. A joint as in claim 9 wherein the exterior surface of the housing is substantially semi-conical.

11. A joint as in claim 10 wherein the interior surface of the collar defines a substantially conical sector.

12. A joint as in claim 11 wherein the exterior surface of the housing defines a substantially semi-conical cam.

13. In a constrained joint having a first part made up of a ball having at least one axis of rotational symmetry, a member extending from the ball, and a collar extending from the member and partially enshrouding the ball, the collar defining an interior surface with at least one axis of rotational symmetry that passes through the center of the ball, a second part, comprising:
   (a) a housing having an exterior surface with at least one axis of rotational symmetry, the exterior surface of the housing being adapted to be received within the interior surface of the collar for rotation there within such that the axis of rotational symmetry of the exterior surface of the housing is coaxial with the axis of rotational symmetry of the interior surface of the collar, the housing defining:
      (i) a socket adapted to receive the ball for rotation there within such that the center of the ball is coincident with the center of the socket, the socket having at least one axis of rotational symmetry and having its centre lying on the exterior surface's axis of rotational symmetry, and
      (ii) a channel connecting the socket to the exterior surface of the housing and adapted to releaseably receive the member.

14. A joint as in claim 13 wherein the ball is substantially spherical.

15. A joint as in claim 14 wherein the socket is substantially spherical.

16. A joint as in claim 15 wherein the exterior surface of the housing is substantially semi-conical.

17. A joint as in claim 16 wherein the interior surface of the collar defines a substantially conical sector.

18. A joint as in claim 17 wherein the exterior surface of the housing defines a substantially semi-conical cam.

19. In a pair of eyeglasses having a frame and an earpiece, a constrained joint for attaching the earpiece to the frame, comprising:
   (a) a ball having at least one axis of rotational symmetry;
   (b) a housing having an exterior surface with at least one axis of rotational symmetry, the housing defining:
      (i) a socket adapted to receive the ball for rotation there within such that the centre of the ball is coincident with the center of the socket, the socket having at least one axis of rotational symmetry and having its centre lying on the exterior surface's axis of rotational symmetry, and
      (ii) a channel connecting the socket to the exterior surface of the housing,
   (c) a member, extending from the ball and adapted to move within the channel, and (d) a collar extending from the member and partially enshrouding the ball, the collar defining an interior surface with at least one axis of rotational symmetry that passes through the center of the ball, the interior surface of the collar being adapted to receive the housing for rotation there within such that the axis of rotational symmetry of the exterior surface of the housing is coaxial with the axis of rotational symmetry of the interior surface of the collar.

20. A joint as in claim 19 wherein the ball is substantially spherical.

21. A joint as in claim 20 wherein the socket is substantially spherical.

22. A joint as in claim 21 wherein the exterior surface of the housing is substantially semi-conical.

23. A joint as in claim 22 wherein the interior surface of the collar defines a substantially conical sector.

24. A joint as in claim 22 wherein the exterior surface of the housing defines a substantially semi-conical cam.

* * * * *